US010037432B2

(12) United States Patent
Wibran et al.

(10) Patent No.: US 10,037,432 B2
(45) Date of Patent: Jul. 31, 2018

(54) IMPLEMENTING FILE SECURITY SETTINGS BASED ON CONTEXT

(71) Applicant: Lenovo (Singapore) Pte. Ltd., Singapore (SG)

(72) Inventors: Goran Hans Wibran, Cary, NC (US); Richard Wayne Cheston, Pittsboro, NC (US); Russell Speight VanBlon, Raleigh, NC (US); David Rivera, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/633,573

(22) Filed: Feb. 27, 2015

(65) Prior Publication Data

US 2016/0253509 A1  Sep. 1, 2016

(51) Int. Cl.
*G06F 21/00* (2013.01)
*G06F 21/62* (2013.01)

(52) U.S. Cl.
CPC .................. *G06F 21/6209* (2013.01)

(58) Field of Classification Search
CPC .................................. G06F 21/6209
USPC .................................. 726/1, 26, 27
See application file for complete search history.

(56) References Cited

U.S. PATENT DOCUMENTS

| | | | | |
|---|---|---|---|---|
| 8,046,831 B2 * | 10/2011 | Porter | ..................... | G06F 21/52 709/225 |
| 2005/0021637 A1 | 1/2005 | Cox | | |
| 2006/0075228 A1 * | 4/2006 | Black | ................. | H04L 63/0428 713/167 |
| 2006/0259948 A1 * | 11/2006 | Calow | ................. | G06F 21/6218 726/1 |
| 2009/0019553 A1 | 1/2009 | Narayanaswami | | |
| 2010/0042690 A1 | 2/2010 | Wall | | |
| 2010/0154056 A1 * | 6/2010 | Smith | ................... | G06F 21/562 726/22 |
| 2012/0180134 A1 | 7/2012 | Coughtrey et al. | | |
| 2012/0324547 A1 | 12/2012 | Vidal | | |
| 2013/0219453 A1 * | 8/2013 | Balinsky | ............... | G06F 21/554 726/1 |
| 2013/0246371 A1 * | 9/2013 | Ahuja | ............... | G06F 17/30613 707/692 |
| 2013/0254831 A1 * | 9/2013 | Roach | .................. | H04L 63/107 726/1 |
| 2014/0033029 A1 | 1/2014 | Pittenger | | |

(Continued)

OTHER PUBLICATIONS

Zoubair, Noura, Final Office Action for U.S. Appl. No. 14/548,782, dated Oct. 17, 2016, 25 pages.

(Continued)

*Primary Examiner* — Sarah Su
(74) *Attorney, Agent, or Firm* — Ference & Associates LLC

(57) ABSTRACT

One embodiment provides a method including: obtaining, using a processor, at least one file; accessing, using a processor, context data associated with the at least one file; evaluating, using a processor, the context data associated with the at least one file against a rule set, wherein the rule set comprises information regarding file security settings; and automatically implementing, using a processor, a file security setting for the at least one file based upon the comparing. Other aspects are described and claimed.

18 Claims, 3 Drawing Sheets

(56) References Cited

U.S. PATENT DOCUMENTS

| | | | |
|---|---|---|---|
| 2014/0075445 A1* | 3/2014 | Wang | G06F 9/50 |
| | | | 718/104 |
| 2014/0181792 A1* | 6/2014 | Fanning | G06F 8/10 |
| | | | 717/124 |
| 2014/0282199 A1* | 9/2014 | Basu | G06F 3/0484 |
| | | | 715/772 |
| 2015/0012964 A1* | 1/2015 | Xie | H04L 63/0815 |
| | | | 726/1 |
| 2015/0052611 A1* | 2/2015 | Wang | G06F 21/563 |
| | | | 726/24 |
| 2015/0118992 A1* | 4/2015 | Wyatt | H04W 12/08 |
| | | | 455/410 |
| 2015/0135254 A1* | 5/2015 | Thilenius | H04L 63/02 |
| | | | 726/1 |
| 2015/0199538 A1 | 7/2015 | Kritt et al. | |
| 2015/0358356 A1* | 12/2015 | Diaz-Tellez | H04L 63/20 |
| | | | 726/1 |

OTHER PUBLICATIONS

Zoubair, Noura, Non-Final Office Action for U.S. Appl. No. 14/548,782, 20 pages.

Zoubair, Noura, Non-Final Office Action for U.S. Appl. No. 14/548,782, dated Feb. 16, 2017, 31 pages.

Zoubair, Noura, Final Office Action for U.S. Appl. No. 14/548,782, dated Jul. 13, 2017, 28 pages.

\* cited by examiner

IMPLEMENTING FILE SECURITY SETTINGS BASED ON CONTEXT

BACKGROUND

Files (e.g., documents, spreadsheets, images, audio, file folders, etc.) may have file security settings which may allow or deny access to a file or folder. Generally, these file security settings are complicated to set and can, if the user is skilled, be modified by a user who has the correct security permissions. For example, a user can put restrictions on the files which may not allow the files to be shared. Companies managing sensitive (e.g., confidential, privileged, etc.) information may have company specific file security policies in an effort to restrict access to or sharing of the sensitive information. Alternatively or additionally, users may create personal files which may contain personally identifiable information (e.g., social security number, account numbers, address, etc.). In order to prevent sensitive (e.g., confidential, privileged, personally identifiable, etc.) information from being manipulated or shared, either accidentally or on purpose, a company and/or user has to modify the file security settings to prevent such modification or sharing of this information.

BRIEF SUMMARY

In summary, one aspect provides a method, comprising: obtaining, using a processor, at least one file; accessing, using a processor, context data associated with the at least one file; evaluating, using a processor, the context data associated with the at least one file against a rule set, wherein the rule set comprises information regarding file security settings; and automatically implementing, using a processor, a file security setting for the at least one file based upon the comparing.

Another aspect provides an information handling device, comprising: a processor; a memory device that stores instructions executable by the processor to: obtain at least one file; access context data associated with the at least one file; evaluate the context data associated with the at least one file against a rule set, wherein the rule set comprises information regarding file security settings; and automatically implement a file security setting for the at least one file based upon the comparing.

A further aspect provides a product, comprising: a storage device having code stored therewith, the code being executable by the processor and comprising: code that obtains at least one file; accesses context data associated with the at least one file; evaluates the context data associated with the at least one file against a rule set, wherein the rule set comprises information regarding file security settings; and automatically implements a file security setting for the at least one file based upon the comparing.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
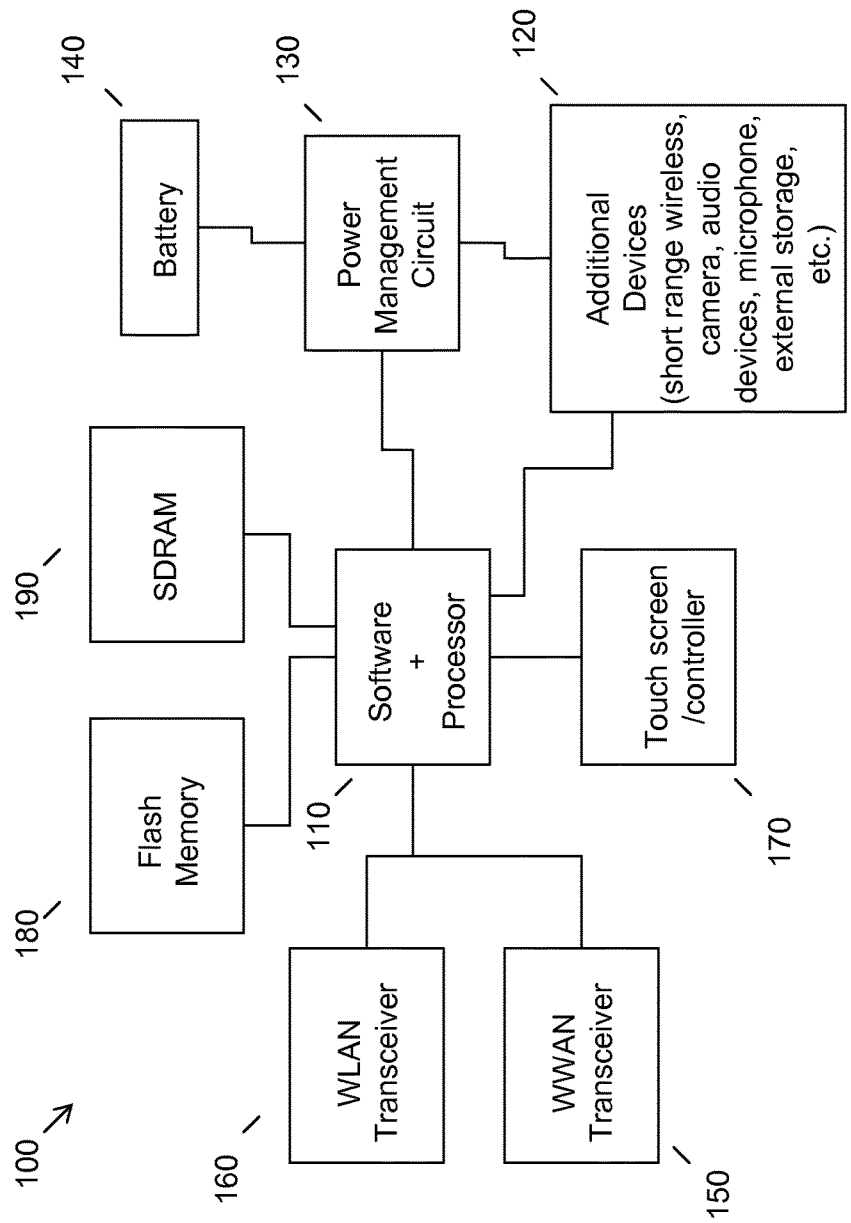
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Companies and users may create or access files (e.g. documents, spreadsheets, images, music files, etc.) which contain sensitive (e.g., confidential, privileged, personally identifiable, etc.) information. These files may be protected from access by a user who should not have access to this information by modifying file security settings of the file. A user who creates personal files including such sensitive information may determine what file security settings should be implemented. To implement these settings, the user must remember to manually change the file security settings. Additionally, in order to ensure consistency between all their files, the user must remember what settings need to be changed and how to change these settings.

In order to protect sensitive information within a company, the company may create security policies relating to the modification of (e.g., copying, deleting, accessing, sharing, etc.) files containing such information. In order to effectuate these company policies regarding security settings of files, a user must manually update the file settings. In this regard, the user may be an end user or creator of the file. Manually setting the correct settings requires that a user have knowledge of the file, knowledge of the company policy regarding file security settings, and knowledge of how to classify the file. These requirements often result in a lack of compliance with the security policies. Alternatively or additionally, if the user does classify the file, there is no guarantee that the user has either classified the file correctly or that another user would not classify the file in a different manner. In other words, consistency between different users and application of policies may be lacking.

Additionally or alternatively, some companies may use a third-party, for example, a compliance department, administrative staff, legal review team, and the like, who may access all company files to determine the file security settings that should be implemented for the files. For example, one current solution may be dynamic access control software. Using this software an administrator or other user can manually tag files that may include confidential, privileged, personally identifiable information (PII), and other types of sensitive information. This tag may then apply access-control permissions or restrictions based upon the rules associated with the tag. This solution requires that the user setting the tags have knowledge of the file's content. Additionally, the user must be allowed to view and/or access the sensitive information, for example, through a security clearance, in order to set the correct tags.

These technical issues present problems for users and companies in that implementing consistent file security settings may be difficult. A person creating personal files may not remember what settings they choose for each file and may then end up with files of the same sensitive information level having differing security settings. A company relying on company personnel to understand and implement the company policies regarding file security settings may have users who do not implement any security policies or users who implement the security policies differently than other users. If a company or user had a method of automatically implementing file security settings based upon file context, the company and/or user could be assured that sensitive information associated with a file would not be modified by or shared with other users who should not have access to such information.

Accordingly, an embodiment provides a method of automatically implementing file security settings based upon file context. An embodiment may obtain a file (e.g., document, spreadsheet, music file, images, etc.) and access context data associated with the file. This context data may include file content, metadata associated with the file, or other data which may be associated with the file. An embodiment may then evaluate this context data against a rule set containing information regarding file security settings. In one embodiment this rule set may contain a context data characteristic and a file security setting which is associated with the context data characteristic. Upon a successful comparison, an embodiment may implement a file security setting for the file. In one embodiment, implementing the file security setting may include manipulating the metadata in order to denote the file as containing sensitive information. Additionally or alternatively, an embodiment may implement the file security setting by restricting the manipulation of the file. This restriction may include restricting sharing, printing, copying, accessing, and the like, of the file.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
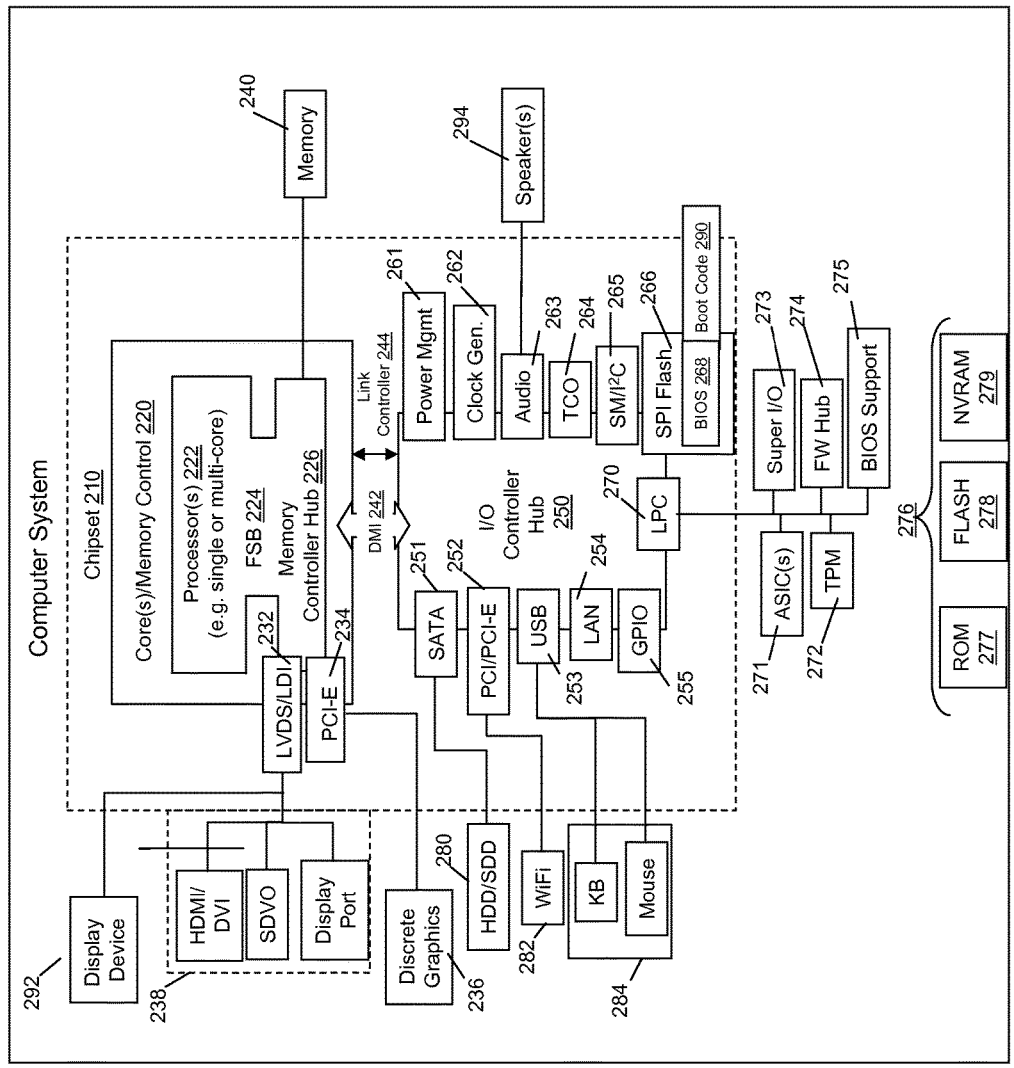
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may use to create or modify files which have security settings. Alternatively or additionally, such information handling device circuitry may be used by users to implement file security settings. For example, the circuitry outlined in FIG. 1 may be implemented in a tablet or smart phone embodiment, whereas the circuitry outlined in FIG. 2 may be implemented in a personal computer embodiment.

Figure 3:
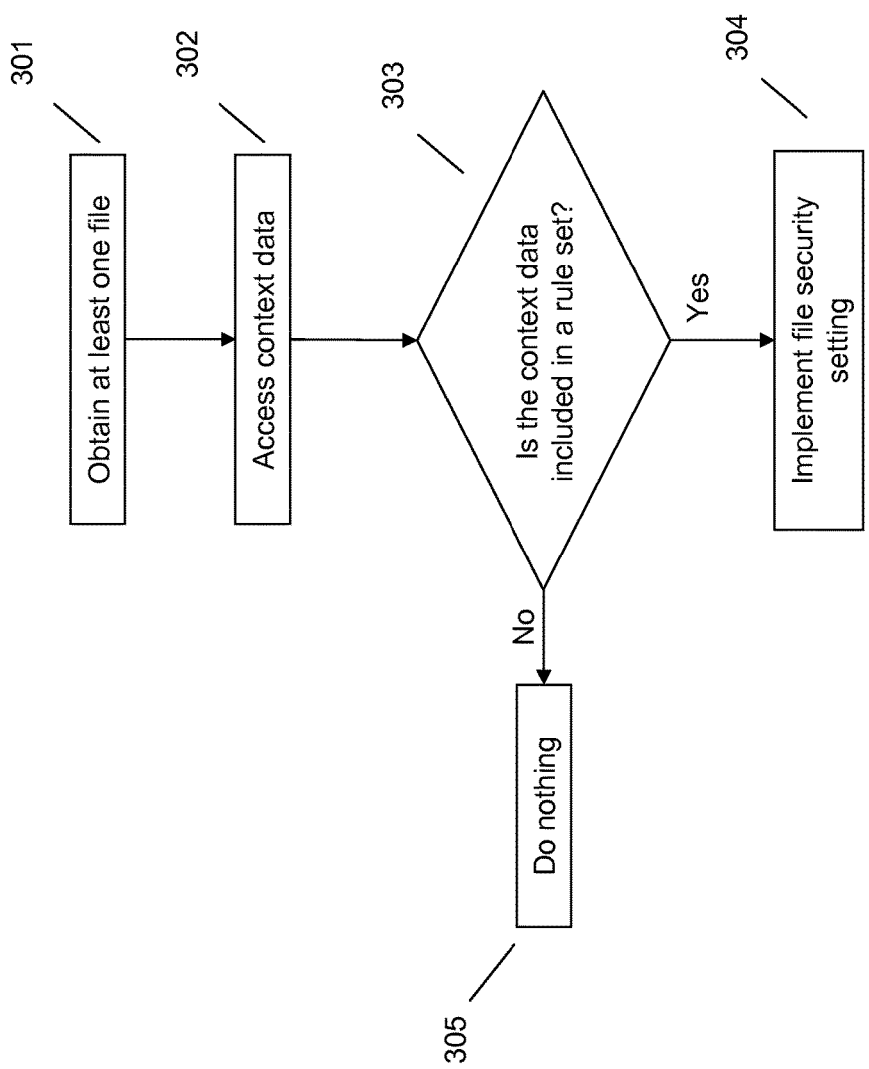
FIG. 3 illustrates an example method of implementing file security settings based on context.

Referring now to FIG. 3, an embodiment may, at 301, obtain at least one file. The obtaining of the file may include a method of gaining access to the file. For example, the file is sent, copied and pasted, created, opened, modified, and the like, to or within a location accessible by an embodiment. At 302, an embodiment may access context data associated with the file. Context data may include any data, including metadata, associated with the file, for example, file name, author, file content, file type, creation date, modification date, and the like. Context data may be generated or created at various times and via various mechanisms. For example, an embodiment may scan the content of the file to determine the context data. In one embodiment, the metadata or content of the file may be generated by another source and processed, e.g., parsed by an embodiment for later use. Multiple methods for accessing context data are possible and contemplated.

In one embodiment, the generating and/or accessing of context data may not be completed immediately after obtaining the file. For example, an embodiment may be set to generate or access context data from files periodically. A user may set a timeframe, for example, once a week, on a particular date, at a particular time, and the like, for an embodiment to generate or access the context data. Alternatively or additionally, a user may set a particular action which triggers an embodiment to generate or access the context data associated with a file. For example, a user may denote that when a file is selected to be shared (e.g., emailed, opened in a conference setting, put into a group folder, etc.) the context data is to be accessed. Alternatively or additionally, an embodiment may have a default setting associated with when the context data is accessed. For example, an embodiment may access the context data when data within or associated with the file is modified (e.g., file creation, modification of file data, modification of file metadata, etc.).

Once an embodiment has accessed the context data associated with the file, an embodiment may, at 303, evaluate the context data against a rule set comprising information regarding file security settings. In one embodiment this evaluation may include comparing the context data to a rule set to determine if that particular type of context data is included in the rule set. The file security settings may include information regarding how a file should be treated based upon particular context data associated with the file. For example, if an embodiment determines that the document contains confidential information, the file security settings may include information for how a confidential file should be treated. The rule set may include default settings. For example, the rule set may indicate that the word "Confidential" found within the document should cause the file security settings to be modified. Additionally or alternatively, the rule set may include data populated by a user. For example, a user may indicate that a particular phrase should be treated as privileged information. The data may additionally be populated by a group within a company. This populated data may then be distributed to all employees or contained in a remote location which is accessed by an embodiment.

The rule set may not contain specific phrases or words, but may instead contain rules. For example, a company policy may contain instructions for confidential documents and may be used as part of the rule set. As another example, the rule set may contain rules based upon the format of a particular dataset. For example, data including a format of XXX-XX-XXXX may indicate personal information. A combination of information may be contained within the rule set, for example, the rule set may contain particular words and may also contain general rules. The rule set may contain information relating to a company policy. Alternatively or additionally, the rule set may contain information relating to a user's personal information. For example, a particular user within a company may have a rule set including information relating to company policy and may additionally add personal information to the rule set.

In one embodiment, the rule set may include a context data characteristic and a file security setting associated with that context data characteristic. The context data characteristic may contain attributes relating to particular context data. For example, the context data characteristic may describe conditions with relation to context data. The context data characteristic, in one embodiment, may be a representation of specific context data. For example, one context data characteristic may include a specific word or phrase found within a context data location. As an example, if a particular word is found within the title of the file, the file should be treated as containing sensitive information. In one embodiment, the context data characteristic may include specific words or phrases that have been indicated as sensitive information. For example, a company may have particular words or phrases that are considered to be a particular type of sensitive information. Context data characteristics may also include non-specific characteristics relating to particular context data. For example, a context data characteristic may include a rule relating to context data. These context data characteristics are examples only and not meant to be limiting.

Like the rule set, the context data characteristic may be populated by the user. Alternatively or additionally, the context data characteristic may be based upon and/or populated by a company policy. For example, a company may have a file or document containing the company policy on file security settings. This company policy may then be used by an embodiment to determine how files should be treated. One embodiment may be able to parse the company policy to determine the rule set or context data characteristics. In other words, the company policy does not necessarily have to be broken up into specific rules. Additionally, a user may not have to notate the company policy in order to indicate the security settings to be used.

If the context data does not match a rule set, is not contained within a rule set, or a rule set does not exist to evaluate the context data against, an embodiment may do nothing at 305. Alternatively, an embodiment may implement default file security settings. If however, the context data matches or is contained within a rule set, then at 304, an embodiment may automatically implement a file security setting for the file. In one embodiment, implementing the file security setting may comprise manipulating the metadata associated with the file. For example, if an embodiment has determined that the file includes particular confidential information, an embodiment may update the metadata of the file to match a particular confidential level. This updating of metadata may include changing the file properties to list the document at the correct sensitive information level. Alternatively or additionally, the updating of metadata may include labeling the file as confidential, for example, changing the file icon to include a lock, changing the title of the file to include confidential, and the like.

In one embodiment, implementing the file security settings may include implementing restrictions on the manipulation of the file. For example, the security settings may prevent copying, printing, accessing the file from a remote location, attaching the file to an email, and the like. The manipulation restrictions may be applicable for only a certain group of users. For example, if the file is denoted at a particular confidential level, and that confidential level allows users of a particular security level to access and/or view the file, the file manipulations may allow users of that security level to receive the file. For example, if a file requires a particular security level, if a user is emailing the document to only users who have that security level, the sending of the email may not be restricted. If, however, one of the recipients tries to forward the email to a user not having the correct security level, the sending of the email would be prevented. The file security settings may be defined by a user, corporate policy, or may include default settings. Implementing the file security settings may include multiple steps, for example, updating the metadata and implementing restrictions.

The various embodiments described herein thus represent a technical improvement to current file security settings in that an embodiment provides a method of accessing context data associated with a file and automatically implementing a file security setting. Using the techniques described herein, a user does not have to manually select the correct file security settings and all security settings are consistently applied to files. Additionally, a company does not have to rely on employees to understand and enforce security provisions and/or policies relating to files.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    obtaining, using a processor, at least one file;
    evaluating, using the processor, context data associated with the at least one file against a rule set, wherein the rule set indicates a file security setting to be implemented for a file having a context data characteristic identified within the rule set and
    automatically implementing, responsive to the evaluating and using the processor, a file security setting for the at least one file based upon the security setting identified from the rule set.

2. The method of claim 1, wherein the automatically implementing the file security setting comprises implementing restrictions on a manipulation of the at least one file.

3. The method of claim 1, wherein the rule set comprises at least one context data characteristic and a file security setting associated with the at least one context data characteristic.

4. The method of claim 3, wherein the at least one context data characteristic is populated by a user.

5. The method of claim 3, wherein the at least one context data characteristic is based upon a company policy.

6. The method of claim 1, wherein the rule set comprises personal information.

7. The method of claim 1, wherein the context data is not contained within the rule set and wherein the automatically implementing the file security setting comprises implementing a default setting.

8. The method of claim 1, wherein the file security setting is defined by a user.

9. The method of claim 1, wherein the context data comprises one or more of: author, file name, file content, and file type.

10. An information handling device, comprising:
    a processor;
    a memory device that stores instructions executable by the processor to:
    obtain at least one file;
    evaluate context data associated with the at least one file against a rule set, wherein the rule set indicates a file security setting to be implemented for a file having a context data characteristic identified within the rule set; and
    automatically implement, responsive to evaluation, a file security setting for the at least one file based upon the security setting identified from the rule set.

11. The information handling device of claim 10, wherein to automatically implement the file security setting comprises implementing restrictions on a manipulation of the at least one file.

12. The information handling device of claim 10, wherein the rule set comprises at least one context data characteristic and a file security setting associated with the at least one context data characteristic.

13. The information handling device of claim 12, wherein the at least one context data characteristic is populated by a user.

14. The information handling device of claim 12, wherein the at least one context data characteristic is based upon a company policy.

15. The information handling device of claim 10, wherein the rule set comprises personal information.

16. The information handling device of claim 10, wherein the context data is not contained within the rule set and wherein to automatically implement the file security setting comprises implementing a default setting.

17. The information handling device of claim 10, wherein the file security setting is defined by a user.

18. A product, comprising:
    a storage device having code stored therewith, the code being executable by a processor and comprising:
    code that obtains at least one file;
    code that evaluates the context data associated with the at least one file against a rule set, wherein the rule set indicates a file security setting to be implemented for a file having a context data characteristic identified within the rule set; and
    code that automatically implements, responsive to the evaluation, a file security setting for the at least one file based upon the security setting identified from the rule set.

* * * * *